United States Patent [19]

Herrington

[11] 4,174,932

[45] Nov. 20, 1979

[54] APPARATUS FOR EXTRUDING TUBULAR THERMOPLASTIC FILM

[75] Inventor: F. John Herrington, Holcomb, N.Y.

[73] Assignee: Mobil Oil Corporation, New York, N.Y.

[21] Appl. No.: 926,476

[22] Filed: Jul. 20, 1978

Related U.S. Application Data

[63] Continuation of Ser. No. 767,097, Feb. 9, 1977, abandoned.

[51] Int. Cl.² .................. B29F 3/08; B29D 23/04
[52] U.S. Cl. ................. 425/72 R; 264/557; 264/564; 264/569; 425/326.1; 425/387.1; 425/388; 425/503; 425/504; 425/461
[58] Field of Search ........ 264/209, 569, 557, 564–568; 425/72 R, 326.1, 71, 461, 84, 85, 503, 504, 387.1, 388

[56] References Cited

U.S. PATENT DOCUMENTS

| | | | |
|---|---|---|---|
| 3,568,252 | 3/1971 | Masuda et al. | 264/569 |
| 3,668,288 | 6/1972 | Takahashi | 425/72 |
| 3,867,083 | 2/1975 | Herrington | 425/326.1 |
| 3,887,673 | 6/1975 | Sato et al. | 425/326.1 |

Primary Examiner—W. E. Hoag
Attorney, Agent, or Firm—Charles A. Huggett; James D. Tierney

[57] ABSTRACT

Apparatus is provided for preparing continuous, seamless blown thermoplastic film tubing by extruding a melt of the thermoplastic through an annular orifice into a tubular shape, inflating the film tube thus formed and cooling such inflated tubing. In the apparatus, the extruded tube while still plastic is passed through an external cooling means having one or more multi-perforated air rings shaped in congruance to the desired shape of the inflating tube. Additionally, final cooling means is provided which cools the precooled film tube with air supplied from a continuous, non interrupted annulus surrounding the tube. A major advantage of this apparatus is that production speeds can be increased while maintaining bubble stability.

5 Claims, 4 Drawing Figures

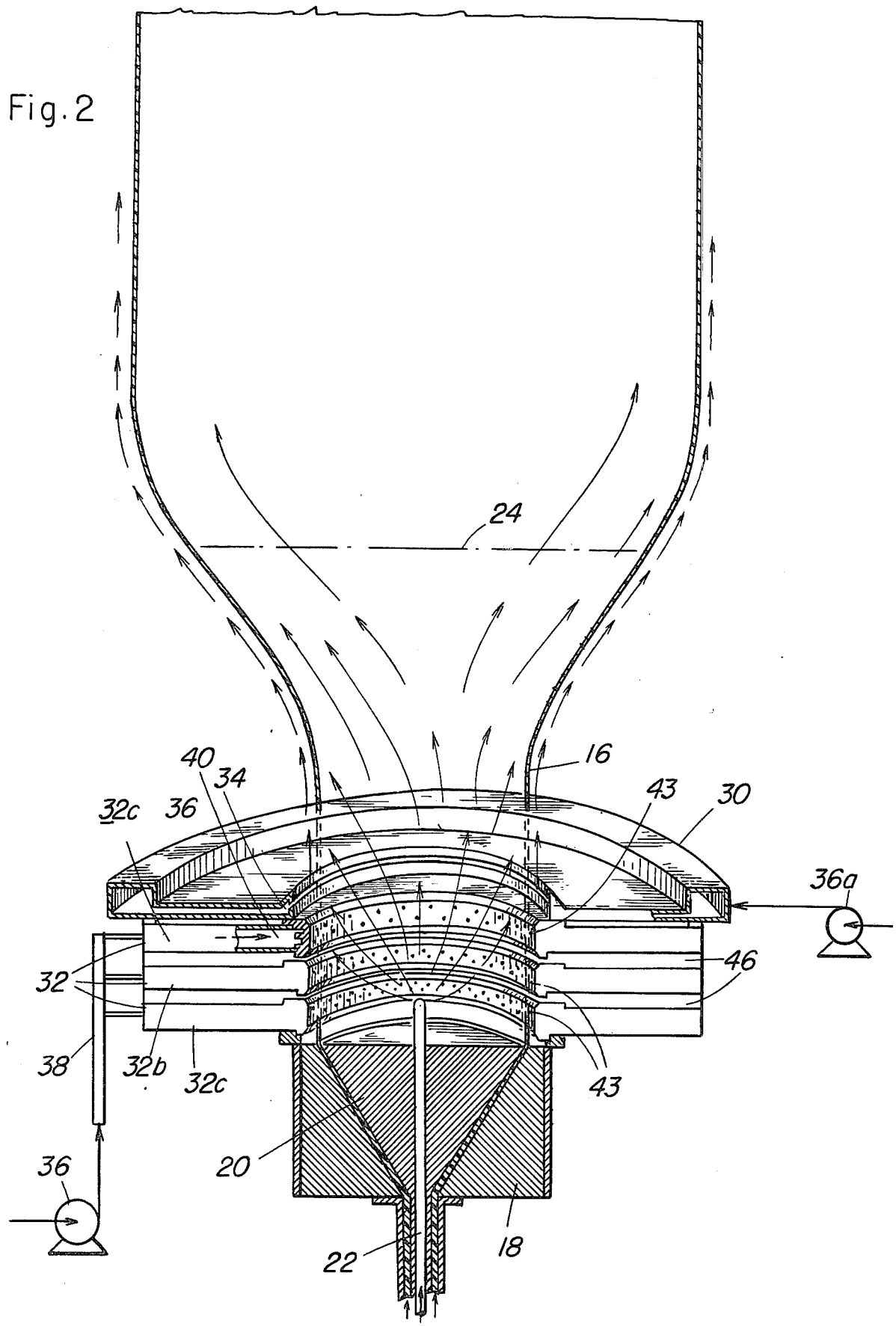

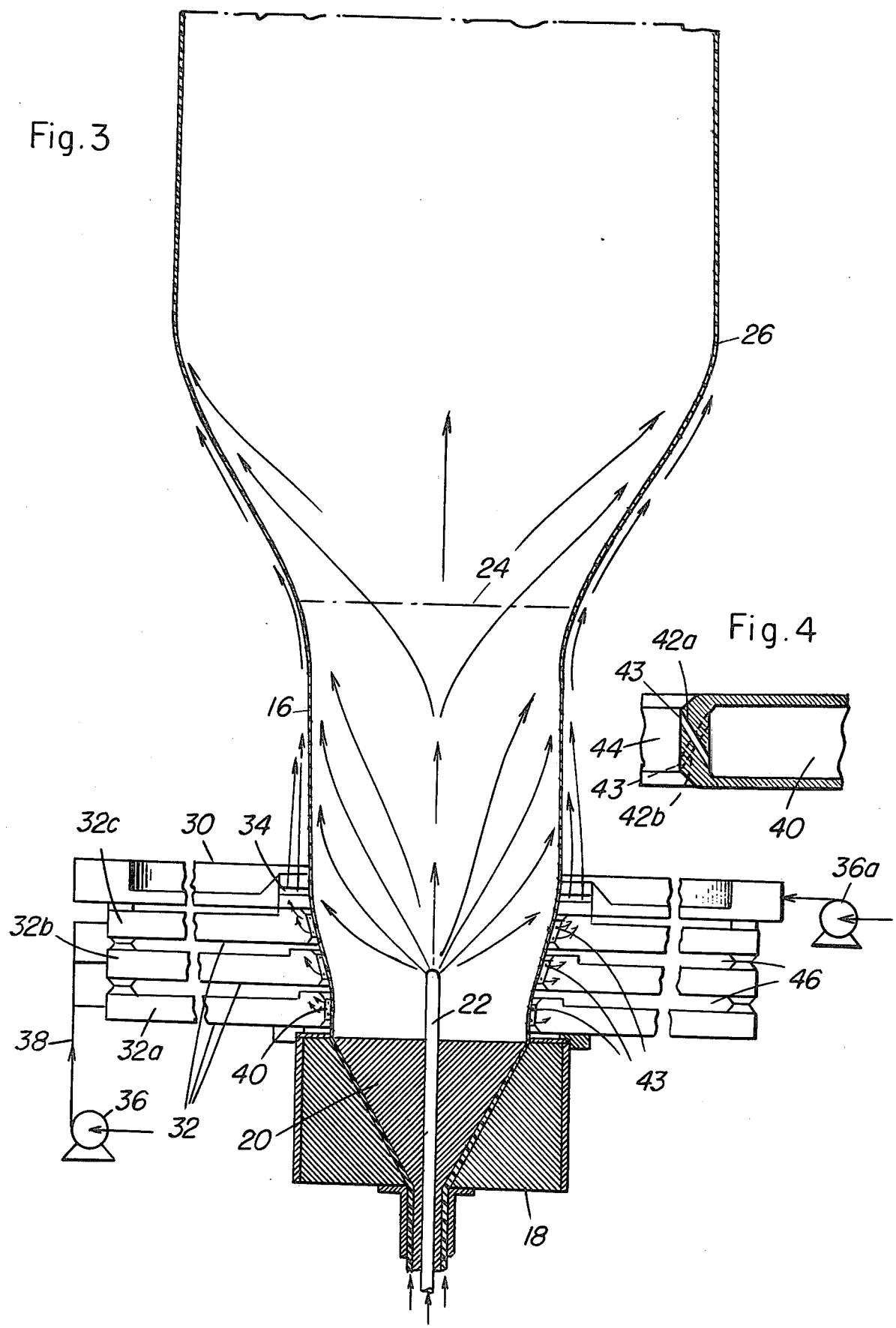

APPARATUS FOR EXTRUDING TUBULAR THERMOPLASTIC FILM

This is a continuation of application Ser. No. 767,097 filed Feb. 9, 1977 now abandoned.

This invention relates to a method and apparatus for preparing continuous, seamless blown thermoplastic film tubing by melt extruding. It more particularly relates to such method and apparatus which produce a thin wall film or sheeting at higher speeds.

It is well known in the plastics art to continuously melt extrude thermoplastics through an annular orifice, apply internal fluid pressure to the tube thus extruded and thereby expand the tube and reduce the wall thickness thereof to appropriate dimensions while cooling and solidifying the extruded thermoplastic. Thereafter, the tubing is flattened between pinch rolls into a double thickness. The flattened double thickness may be wound into a cylindrical roll for storage and subsequent use as a tube, the tubing may be split to form a single thickness sheet of double width wound into one roll, or two single thickness sheets wound into two separate rolls.

One of the major problems in this art is to cool the extruded bubble of thermoplastic material. Production rate for any given tube (bubble) size is limited by the character of the bubble being extruded. Thus, under a given set of operating conditions, increasing extruder output will cause the thermoplastic to be formed into the tube at a higher rate but since the heat exchange character of the system will not have changed, it will also cause a rise in the height of the frost line (that is the line where the extruded tube turns from molten to solid character). This in turn causes an increase in the instability of the extruded bubble because its unsupported molten length has become too long. Supporting the film bubble in general permits increased cooling air impingement and therefore increased extrusion speeds.

Issued U.S. Pat. No. 3,867,083, commonly assigned, discloses a method for the high speed extrusion of tubular film which is characterized by having exceptionally high speed and exceptionally good gauge uniformity which comprises employment of a plurality of multi-apertured cooling rings to shape and cool the extruded film. The present invention combines such a system with an air ring cooling system; the portion of the molten film nearest the die is cooled by the multi-apertured cooling rings, and the portion nearest the frost line is cooled by a conventional air ring. This offers a substantial increase in cooling speed in contrast to conventional cooling, yet has more flexibility than prior art high-speed cooling systems because the final film width can be adjusted by changing the amount of air within the bubble, as in the case of conventional cooling, whereas film width changes in prior art high-speed cooling systems required changing at least a portion of the surrounding cooling housing. It is also easier for operating personnel to control than the prior art high-speed system because it does not require controlled air pressure within the bubble, and is similar in operating technique to conventional cooling.

Accordingly, an object of this invention is to provide an improved method and apparatus for producing blown tubing from thermoplastic materials, particularly polymers of 1-olefins, e.g., polyethylene.

A further object of this invention is to produce thin thermoplastic film of good physical properties at higher speeds than were heretofore possible.

These and further objects of this invention will become apparent to those skilled in the art from the following discussion, appended claims and accompanying drawings.

FIG. 2 is an enlarged view of the cooling ring positions of the apparatus of FIG. 1 embodying the features of the present invention.

FIG. 3 is an alternate embodiment of the apparatus of the present invention.

FIG. 4 is a fragmentary cross section view of a portion of the multi-perforated cooling segments shown in FIGS. 1, 2 and 3.

Figure 1:
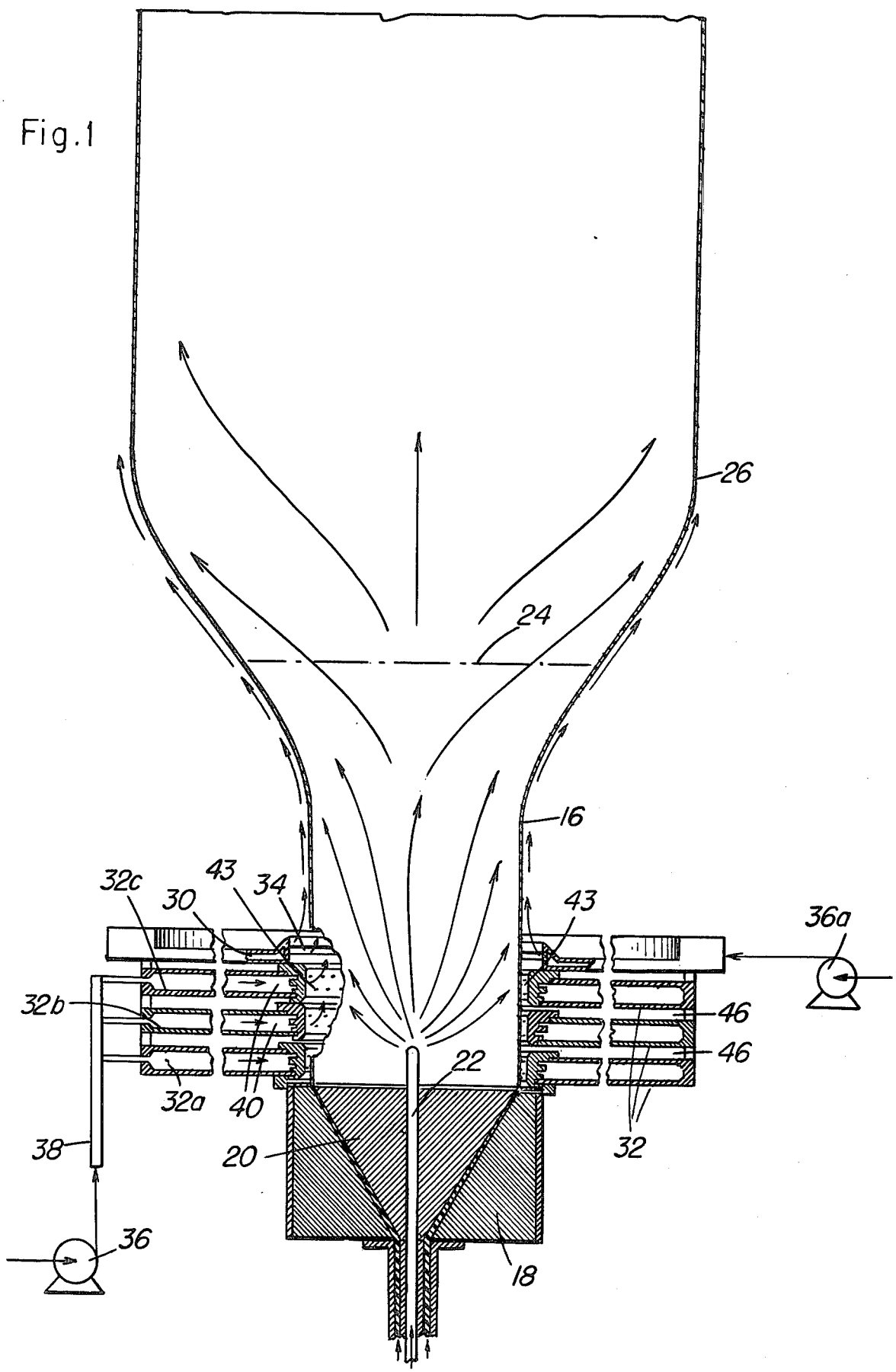
FIG. 1 is a front elevation, in section, of a typical tubular extrusion apparatus embodying certain features of the present invention.

The primary speed limiting factor in any blown film extrusion system which is incorporated with in-line processing of the extruded film product such as bag making operations and the like, is the length of time which is required to cool and solidify the extruded film bubble before the tube may be collapsed and continuously passed on to further in-line processing. The present invention offers intense pre-cooling of the extruded tubular thermoplastic film utilizing multi-perforated cooling segments, and further cooling consisting of inwardly directed and upwardly blowing air under pressure which is continuous, i.e., supplied not from a plurality of discrete orifices but rather from a continuous encircling annulus about the extruded film tube. It has been found in utilizing the system of the present invention that the speed limitation factor hereinabove discussed is greatly reduced so that the advantages of an in-line operation, utilizing the production rates of current commercially available bag making equipment may be realized. Such equipment is capable of operation at rates of production which are in the order of 10% to 50% faster than the rate at which tubular film was extruded and cooled in prior art conventional blown film extrusion operations.

In accord with and fulfilling these objects, one aspect of this invention resides in a novel apparatus which is useful in tubular melt extrusion of thermoplastics. This apparatus comprises conventional extruder and annular extrusion die means and conventional internal air, or other fluid, introduction means axially mounted in the annular die. The apparatus also includes conventional pinch roller means spaced from the annular die a sufficient distance so that the tube passing therethrough is sufficiently cooled to be substantially solid and nontacky. Further conventional portions of the apparatus include means to provide sufficient air or other fluid inside the extruded bubble to at least balance the ambient atmospheric pressure and permit the extrudate to form the intended bubble.

One of the important features of the apparatus of this invention is the use of means for providing intensive, high cooling rates for thermoplastic material from the time it issues from the annular die to the time, downstream thereof, at which it is in a more viscous, self-supporting state. This means comprises a housing of either generally cylindrical or diverging, or generally flared shape. It is not intended by such a characterization of the configuration imposition housing that it be so limited.

The means referred to above includes multiple rows of channels therethrough each terminating in an aperture on the surface thereof directed toward the extruded tubing. Each row of apertures lies along a plane generally normal to the axis of the annular extrusion die. Each row of channels and of course their corresponding apertures, is associated with one next adjacent row of channels and apertures so that such rows cooperate in pairs. The individual apertures in each of said pair of rows are streamwisedly directed apart at a very wide angle, in fact preferably the widest angle possible considering all other mechanical constraints as will become apparent from this entire specification. The axes of these cooperating aperture and channel pairs are positioned at a very small acute angle with respect to the surface of the thermoplastic tube extruded from the referred to annular die. Although it is probably the most efficient configuration, the referred to channels need not be cylindrical in shape but can be a converging nozzle or other configuration. It is only important that these channels cause fluid flowing therethrough to diverge preferably to a maximum extent, upon emergence from each aperture pair.

Means are provided for forcing air or some other appropriate fluid through the channels and out the apertures generally toward the extruded thermoplastic tubing. Outward passage means are also provided between the aforementioned pairs of aperture rows for the air or other fluid to escape. Thus, a circulatory system is provided forcing fluid from the outside toward the extruded tube, passing the fluid along the extruded tube and then passing the fluid back to the outside. Where the fluid is air, the atmosphere can be a suitable reservoir to pump from and to. If other fluid is used, a suitable reservoir and closed system can be provided or the outward passage can simply vent the fluid to the atmosphere.

In accordance with the present invention, in addition to the multi-apertured cooling ring segments, it has been found that when a conventional air ring is mounted substantially adjacent the uppermost ring segment in a stack of such segments, the extrusion throughput rates are substantially increased with no sacrifice in final film quality. In a specific embodiment, the apertured face of the multi-aperture ring segments may be progressively angled outwardly so that they serve to impose expanding shape to the semimolten tubing as it is extruded as shown in FIG. 3. Alternatively, they may be vertical i.e., in a plane substantially parallel to the path of the extruded tubing as shown in FIGS. 1 and 2 so that as the tube passes consecutive ring segments, expansion of the tube does not occur. Obviously, the selection of either of these systems of cooling segment configuration will depend upon the desired blow-up ratio, (tube expansion) it is desired to impart to the tube as it is being extruded.

As hereinbefore noted, the air ring portion of the tubular cooling system of the present invention, is positioned adjacent to the uppermost cooling ring segment. The air ring may be of conventional design such as, for example, air cooling rings for tubular extrusion which are commercially available for use as the air ring to be used at the die.

There is preferably a spacing on the order of about 0.25" between the tubular extrusion die and the lower face of the bottom multi-apertured ring segment to permit air from that segment to exhaust. In certain instances it is desirable to insulate the top face of the die to prevent if from being cooled by this exhausting air flow moving across the upper surface of the die.

Fluid, such as air, suitably cools the extruded tubing and solidifies it to a sufficient extent to render it non-tacky and dimensionally stable. Given just this function, the tube of extruded thermoplastic material would freely expand according to the pressure applied by the internal fluid as a function of the external cooling rate applied and inherent liquid strength of the thermoplastic material in use. The apparatus and process of the instant invention goes further than simply controlling cooling rate and thereby attempting to control rate and type of expansion of the extruded tubing. The particular configuration of the apertures referred to above causes the fluid flowing out of them into a jet pump effect with respect to the space between cooperating aperture pairs whereby forming a significant vacuum and thus drawing the extruded thermoplastic tubing toward the inside face of the segment through which the aperture pairs emerge and causing the extruded tubing to conform closely to the shape of this configuration imposition means.

It should be clear that many of the processing variables are interdependent and are not independently definable. The crux of this invention is to impose a particular rate and, in certain embodiments, shape of expansion upon an extruded tube of thermoplastic material while cooling the extruded molten tube to a dimensionally stable and nontacky condition.

The thermoplastic material extruded into a tube according to this invention may be a polyolefin such as polyethylene, polypropylene, polybutene-1, copolymers of two or more of these with or without other olefins, polyvinyl or vinylidene chloride, vinyl or vinylidene chloride copolymers with acrylates, acrylonitrile, olefins and the like, acrylic homo and/or copolymers, styrene homo and/or copolymers, and in general, such other polymeric materials as are conventionally melt extruded into film form.

The thermoplastic is usually extruded through an annular die having a diameter of about 0.5 to 16 inches and a die gap of about 0.010 to 0.100 inch. Extrusion rates are of course dependent upon the extruder used however, flow rates of about 1 to 12, preferably 4 to 8, pounds per hour per inch of final bubble circumference can be easily maintained within the parameters of the practice of this invention. Blow up ratios, that is, the ratio of final film diameter to die diameter, on the order of about 1.5 to 5 are suitable as are final film thicknesses of about 0.4 to 10 mils. The preferred internal pressurizing fluid and external cooling fluids are air, however, other similar acting relatively inert gases can be used. The external fluid to the segments should be maintained at a temperature of about 0° to 200° F. and be fed at a rate of about 75 to 600 SCFM per square foot of surface are of the molten tubing being cooled. It is within the scope of this invention to provide means within the island portion of the extrusion die means to extract some or all of the air injected into the extruded tube so as to form a flowing system of air.

The configuration imposition means may be composed of a single monolithic structure of such height as to extend from the plane of the annular extrusion die to just below the lowest conventional air ring, or it may be series of stacked rings of similar cumulative height. In either case, the aperture row pairs should be spaced about ½ to 4 inch apart with the two rows in each pair spaced about 1/16 to ¾ inches apart. The apertures themselves and the channels related thereto should preferably be in radial planes respectively and should be spaced apart about 2 to 6 aperture diameters apart in each row and the channel pairs should diverge about 50° to 160°, preferably 100° to 150°. The air return means between aperture row pairs should be about ⅛ to ½ inches wide so as to permit ready flow of the air back from the extruded tubing. It should be noted that the velocity and/or temperature of the external air can be substantially constant, at all aperture positions or it may be profiled in either or both regards as processing conditions dictate. The upper most air ring in the cooling system of the present invention, i.e., air ring that is not characterized as being multi-apertured but rather which has a continuously extending annular orifice around the inside face of the ring, desirably has an orifice opening from about ⅛" up to about ½" and the orifice itself is so baffled as to provide air either inwardly and upwardly or straight inwardly, or straight upwardly, at the extruded tubing. It is provided to use air pressures in the range of from about 1 inch of water up to about 12 inches of water and preferably about 4 inches of water in its upper most air ring.

Referring now to the drawings, suitable thermoplastic resin is fed to a rotating screw type extruder (not shown) in which it is plastified and then extruded through an annular die 18 into a tube 16 of molten thermoplastic material. Means 22, in the island 20 of the annular die 18 are provided for feeding a fluid, suitably air, into the thermoplastic tube 26. As the tube proceeds downstream it cools until, at a frost line 24, it solidifies into a dimensionally stable tubular structure 26. This solid tube 26 is collapsed by a pair of collapsing shields and then passes through a pair of take off nip rollers (not shown) from whence it is taken to other processing (not shown, e.g. bag making) or is rolled in the form of flattened tubing.

There are provided multiple lower rings 32a, 32b and 32c which may be separate entities in a housing or may be a single monolithic structure. A pump 36 feeds a fluid, suitably air, through a manifold 38 into the interior 40 of the rings 32. This fluid is then impinged upon the extruded tubing 16 through the diverging channels 42a and 42b via apertures 43, as more clearly shonw in FIG. 4, whereby creating a decreased pressure between them (in the area designated 44) and forcing this fluid to pass out of the system through passages 46 between adjacent rings. The high velocity fluid leaving the proximity of the extruded tube also causes a slight decrease in pressure. These pressure drops draw the still molten extruded tube 16 toward the rings 32 but the ejecting fluid forms a cushion between the rings and the tubing so as to prevent the tubing from contacting the rings and getting hung up on them while still in the molten condition.

As shown in FIGS. 1 and 2 super imposed above the multi-perforated rings 32a, 32b and 32c there is located final cooling ring 30 which is supplied with air under pressure from pump 36a. Air extends from ring 30 through continuous annular orifice 34 and impinges upon tube 16. The flow of air is directed inwardly and upwardly from ring 30 by a lip or flange which is located around the lower periphery of orifice 34. Alternatively, it may be directed just inwardly or just upwardly. In the embodiment illustrated in FIGS. 1 and 2, the precooler segments 32a, 32b and 32c are characterized by having an inside cylindrical face which is substantially vertical, i.e., in a plain which is parallel with the plane of the advancing tube 16. In the embodiment illustrated in FIG. 3 multi-perforated rings 32b and 32c have an interface which is angled outwardly away from the vertical direction of extruded tube 16 thereby causing an increase in the diameter of tube 16 as it proceeds past rings 32b and 32c, the tube being drawn out or expanded as a result of the partial vacuum formed as hereinabove described.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. In an apparatus for forming tubular thermoplastic film comprising extruder means; annular extrusion die means, adopted in combination to extrude a single tube of thermoplastic film; pinch rollers spaced downstream from said annular extrusion die adopted to flatten said tube; and means for introducing a fluid under pressure into said tube whereby to biaxially expand said tube and reduce the wall thickness thereof; the improvement which comprises a housing member assembly disposed concentric to said extruded tube downstream of, and adjacent to, said annular die, said tubular thermoplastic film passing through said housing member assembly upon exiting from said die, said assembly being further characterized by having multiple rows of channels therethrough, each of said channels terminating in an aperture on the inner surface of said housing, said apertures being arranged in a series of streamwisedly spaced pairs of diverging aperture row adjacent to and directed towards said extruded tubing in an overall diverging shape, said streamwisedly spaced pairs of aperture rows having individual apertures in one row of the pair which diverge from the adjacent apertures in the second row of the pair, means for forcing a fluid through said apertures towards said extruded tubing and then away from such tubing, whereby creating a suction and thus drawing said extruded tubing toward said assembly; an uppermost cooling housing superimposed above said assembly, said cooling housing comprising a continuous circular housing which surrounds said tube and which circular housing supplies cooling air under pressure to said tube, said air being outwardly and upwardly directed.

2. An apparatus as claimed in claim 1 wherein said apertures diverge at an angle of about 50° to 160°.

3. An apparatus as claimed in claim 1 wherein said apertures terminate inwardly directed channels lying in radial planes respectively with respect to said tubing.

4. An apparatus as claimed in claim 1 wherein said apertures in the same row are spaced apart about 2 to 6 aperture diameters.

5. An apparatus as claimed in claim 1 wherein each of said pair of aperture rows is located in a separate ring member and said ring members are streamwisedly spaced whereby creating said means for drawing said fluid away from said tubing.

* * * * *